United States Patent
Aoki

(10) Patent No.: US 9,630,679 B2
(45) Date of Patent: Apr. 25, 2017

(54) SPRING LEG OF FRONT FORK

(71) Applicant: SHOWA CORPORATION, Gyoda-shi (JP)

(72) Inventor: Yasuhiro Aoki, Fukuroi (JP)

(73) Assignee: SHOWA CORPORATION, Gyoda-Shi (JP)

(*) Notice: Subject to any disclaimer, the term of this patent is extended or adjusted under 35 U.S.C. 154(b) by 76 days.

(21) Appl. No.: 14/026,415

(22) Filed: Sep. 13, 2013

(65) Prior Publication Data

US 2014/0210146 A1 Jul. 31, 2014

(30) Foreign Application Priority Data

Jan. 31, 2013 (JP) .................. 2013-016380

(51) Int. Cl.
*B60G 15/08* (2006.01)
*B62K 25/08* (2006.01)

(52) U.S. Cl.
CPC .................... *B62K 25/08* (2013.01)

(58) Field of Classification Search
CPC ...... B60G 15/08; B60G 15/061; B62K 25/08; B62K 2025/048; F16F 9/325
USPC ....................................... 188/322.2
See application file for complete search history.

(56) References Cited

U.S. PATENT DOCUMENTS

| 3,376,032 | A | * | 4/1968 | Schmid | 267/218 |
| 4,647,025 | A | | 3/1987 | Gold | |
| 6,997,293 | B2 | * | 2/2006 | Tomonaga et al. | 188/315 |
| 7,374,028 | B2 | * | 5/2008 | Fox | F16F 9/44 188/322.13 |
| 2004/0222056 | A1 | * | 11/2004 | Fox | B62K 25/04 188/267 |

FOREIGN PATENT DOCUMENTS

| JP | 52-66161 A | | 6/1977 | |
| JP | 2001-501155 A | | 1/2001 | |
| JP | 2012092945 A | * | 5/2012 | ........ F16F 9/02 |
| WO | WO-99/03721 A1 | | 1/1999 | |

* cited by examiner

*Primary Examiner* — Xuan Lan Nguyen
(74) *Attorney, Agent, or Firm* — Leason Ellis LLP

(57) ABSTRACT

In a spring leg of a front fork, the capacity of a rebound air spring chamber is expanded and a stable rebound reaction force is ensured, and the spring leg of the front fork is provided with a sub-tank including an air chamber communicating with a rebound air spring chamber.

19 Claims, 18 Drawing Sheets

SPRING LEG OF FRONT FORK

CROSS-REFERENCE TO RELATED APPLICATIONS

This application is based on and claims priority under 35 U.S.C. 119 from Japanese Patent Application No. 2013-016380 filed on Jan. 31, 2013, the entire content of which is incorporated herein by reference.

BACKGROUND

1. Technical Field

The present invention relates to a spring leg suitably used for a front fork for a motorcycle.

2. Related Art

As a spring leg of a front fork for a motorcycle, as described in Patent Literature 1 (JP-T-2001-501155), there is a spring leg not incorporated with a suspension spring made of a metal spring but incorporated with a suspension spring made of an air spring. In the spring leg, an axle side tube is slidably engaged with a vehicle body side tube, and a guide of a guide rod provided in the center portion of the axle side tube is inserted into the vehicle body side tube. A positive air spring chamber defined by the guide of the guide rod is formed inside the vehicle body side tube. The spring leg includes a rebound air spring chamber (a negative air spring chamber) formed between a rod guide, which is provided in the vehicle body side tube and in which the guide rod is inserted and supported, and the guide of the guide rod inserted into the vehicle body side tube inside the vehicle body side tube.

The spring leg described in Patent Literature 1 urges, with a positive spring force generated in the positive air spring chamber compressed in a compression side stroke, the vehicle body side tube and the axle side tube in a direction for extending the tubes. The spring leg urges, with a negative spring force (a rebound reaction force) generated in the rebound air spring chamber compressed on a full extension side of an extension side stroke, the vehicle body side tube and the axle side tube in a direction for compressing the tubes.

SUMMARY OF INVENTION

In the spring leg described in Patent Literature 1, the rebound air spring chamber is configured by the limited section between the rod guide of the vehicle body side tube and the guide of the guide rod inserted into the vehicle body side tube on the inside of the vehicle body side tube. Therefore, a sufficient capacity cannot be ensured in the rebound air spring chamber, a high compression ratio is inevitable, it is difficult to stabilize the rebound reaction force near full extension of the extension side stroke, and it is difficult to improve steering stability.

It is an object of the present invention to expand the capacity of the rebound air spring chamber and ensure a stable rebound reaction force in the spring leg of the front fork.

[1] According to an aspect of the invention, it is a spring leg of a front fork not incorporated with a suspension spring made of a metal spring but incorporated with a suspension spring made of an air spring, including: a vehicle body side tube; an axle side tube being slidably engaged with the vehicle body side tube; a guide cylinder being provided in a center portion inside one of the vehicle body side tube and the axle side tube; a guide rod provided in a center portion inside the other of the vehicle body side tube and the axle side tube where the guide rod has a guide being inserted into the guide cylinder; an inner side air spring chamber defined by the guide of the guide rod inside the guide cylinder; a rod guide which is provided in the guide cylinder where the guide rod is inserted in and supported by the rod guide; a rebound air spring chamber formed between the rod guide, and the guide of the guide rod inserted into the guide cylinder inside of the guide cylinder; and at least one of sub-tanks each including an air chamber communicating with the rebound air spring chamber.

[2] The spring leg of the front fork may, further include: an outer side air spring chamber defined by the vehicle body side tube and the axle side tube on an outer side of the inner side air spring chamber in the guide cylinder.

[3] The spring leg of the front fork may have a configuration in which the sub-tank is provided outside the vehicle body side tube and the axle side tube.

[4] The spring leg of the front fork may have a configuration in which the sub-tank is provided in an axle bracket attached to a lower end portion of the axle side tube.

[5] The spring leg of the front fork may have a configuration in which the sub-tank is provided inside the vehicle body side tube and the axle side tube.

[6] The spring leg of the front fork may have a configuration in which the sub-tank is provided in the guide of the guide rod.

[7] The spring leg of the front fork may have a configuration in which the sub-tank is provided in the guide rod.

[8] The spring leg of the front fork may have a configuration in which the sub-tanks are provided on both outside and inside the vehicle body side tube and the axle side tube.

With the configuration of [1], one air spring is formed by the inner side air spring chamber compressed in a compression side stroke. A spring force F1 of the air spring of the inner side air spring chamber urges the vehicle body side tube and the axle side tube in a direction for extending the tubes.

In the spring leg, another air spring is formed by the rebound air spring chamber compressed on a full extension side of an extension side stroke. A spring force F3 of the air spring of the rebound air spring chamber urges, resisting the spring force F1 of the air spring of the inner side air spring chamber, the vehicle body side tube and the axle side tube in a direction for contracting the tubes.

Therefore, in the front fork, with respect to extension and compression strokes of the spring leg, the spring force F1 of the air spring of the inner side air spring chamber, which urges the vehicle body side tube and the axle side tube in the direction for extending the tubes, and the spring force F3 of the air spring of the rebound air spring chamber, which urges the vehicle body side tube and the axle side tube in the direction for contracting the tubes, generate a combined spring force F, which is a sum of the forces. The combined spring force F increases a spring force in a latter half on the compression side without increasing a spring force in initial to intermediate regions on the full extension side of the extension and compression strokes.

At this point, the sub-tank including the air chamber communicating with the rebound air spring chamber is provided. The sub-tank can expand the capacity of the rebound air spring chamber and reduce a compression ratio even under a high-pressure state. Therefore, near the full extension of the extension side stroke, a rebound reaction force (the spring force F3) is stabilized and the steering stability is improved.

With the configuration of [2], like the inner side air spring chamber, the air spring by the outer side air spring chamber compressed in the compression side stroke is also formed. The spring force F1 of the air spring of the inner side air spring chamber, a spring force F2 of the air spring of the outer side air spring chamber, and the spring force F3 of the air spring of the rebound air spring chamber generate the combined spring force F, which is a sum of the spring forces.

With the configuration of [3], the sub-tank is provided on the outside of the vehicle body side tube and the axle side tube. Therefore, irrespective of the sizes of the vehicle body side tube and the axle side tube, the sub-tank including the air chamber having a certain capacity can be ensured on the outside of the tubes. Further, it is possible to easily expand the capacity of the rebound air spring chamber.

With the configuration of [4], the sub-tank is provided in the axle bracket attached to the lower end portion of the axle side tube. When the guide rod is erected in the axle bracket, the air chamber of the sub-tank easily communicates with the rebound air spring chamber via a communication passage provided in the axle side tube, a hollow portion provided in the guide rod, and a communication hole provided in the guide.

With the configuration of [5], the sub-tank is provided on the inside of the vehicle body side tube and the axle side tube. Therefore, irrespective of the configuration on the outside of the vehicle body side tube and the axle side tube, the sub-tank including an air chamber having a certain capacity can be ensured on the inside of the tubes. Further, it is possible to easily expand the capacity of the rebound air spring chamber.

With the configuration of [6], the sub-tank is provided in the guide of the guide rod configured to define the rebound air spring chamber. Therefore, the air chamber of the sub-tank is easily communicated with the rebound air spring chamber.

With the configuration of [7], the sub-tank is provided in the guide rod surrounded by the rebound air spring chamber. Therefore, the air chamber of the sub-tank is easily communicated with the rebound air spring chamber.

With the configuration of [8], the sub-tanks are provided on both the outside, and the inside of the vehicle body side tube and the axle side tube. With the sub-tanks provided on the inside and the outside of the vehicle body side tube and the axle side tube, it is possible to expand a total capacity of air chambers formed by the sub-tanks and further expand the capacity of the rebound air spring chamber.

Figure 1:
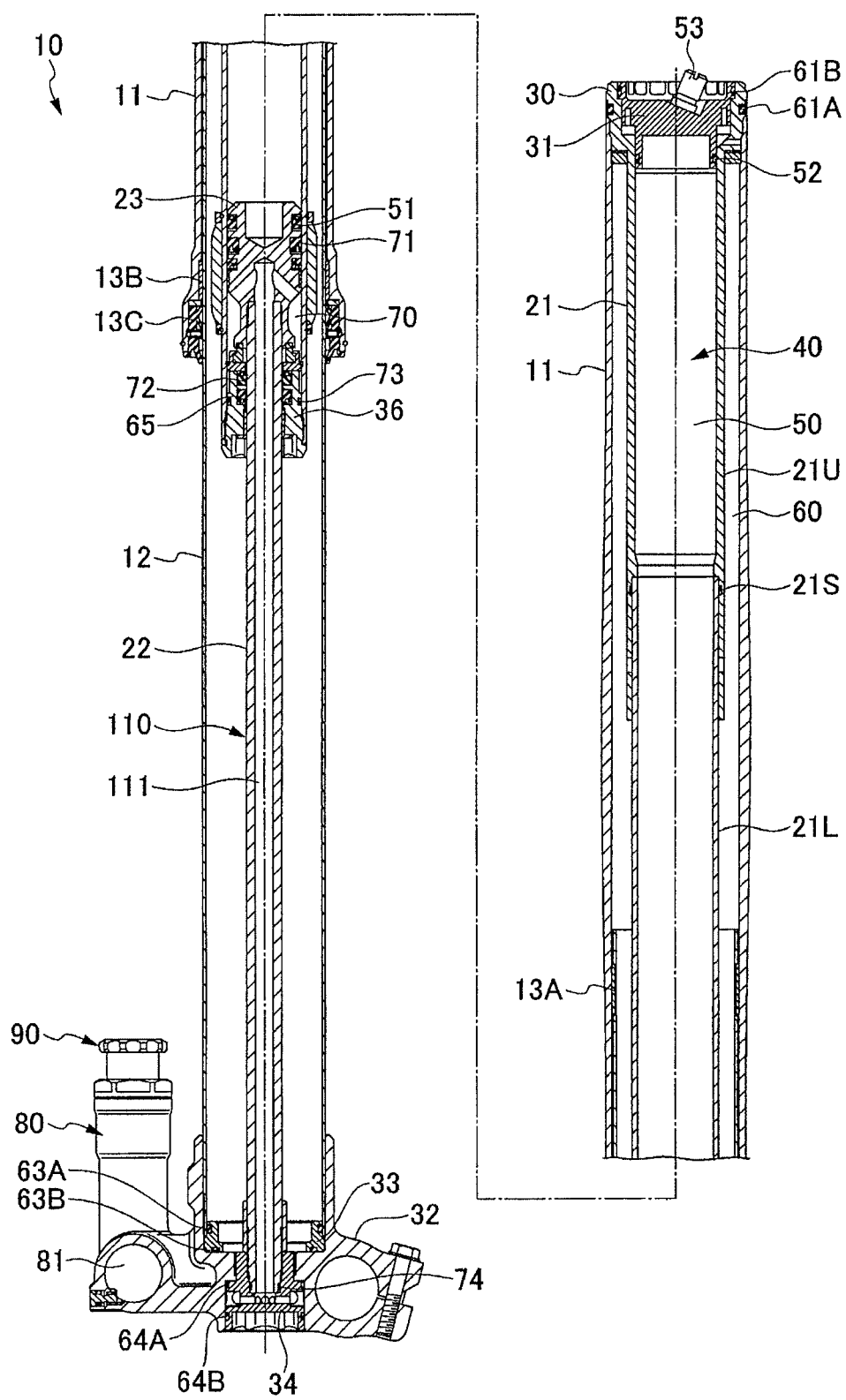
FIG. 1 is a sectional view showing an entire spring leg in a first embodiment.
Figure 2:
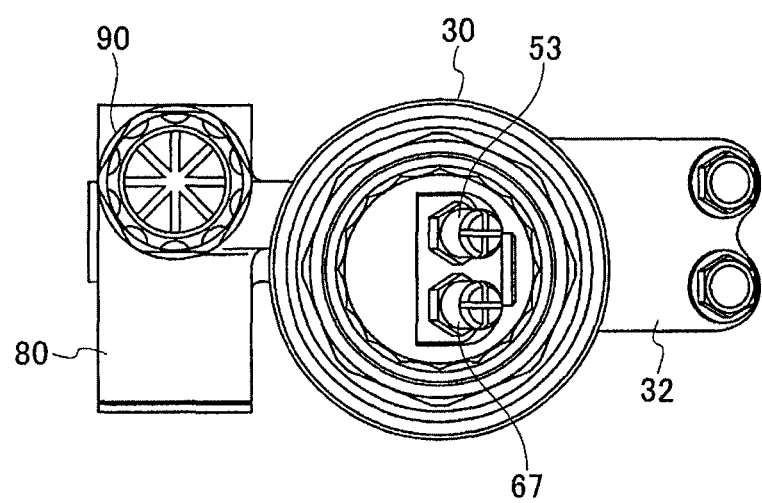
FIG. 2 is a plan view of FIG. 1.

DESCRIPTION OF EMBODIMENTS (First Embodiment) (FIGS. 1 to 8C)

A spring leg 10 shown in FIGS. 1 to 4 configures at least one of left and right legs of a front fork of a motorcycle or the like. The spring leg 10 does not incorporate a suspension spring made of a damper and a metal spring but incorporates a suspension spring made of an air spring. The other of the left and right legs of the front fork is made of a damper leg incorporating a damper and not incorporating a suspension spring. However, the other leg may be a spring leg same as the spring leg 10.

As shown in FIGS. 1 to 4, in the spring leg 10, an axle side tube (an inner tube) 12 is slidably inserted into a vehicle body side tube (an outer tube) 11 while being sealed via bushes 13A and 13B and a seal member 13C. In the spring leg 10, a guide cylinder 21 is suspended in a center portion of an inside of the vehicle body side tube 11. A distal end guide 23 of a guide rod 22 erected in a center portion of an inside of the axle side tube 12 is slidably inserted in to the guide cylinder 21. A piston ring 24 configured to come into slide contact with an inner circumference of the guide cylinder 21 is deposited on an outer circumference of the distal end guide 23 of the guide rod 22.

The vehicle body side tube 11 is supported on a vehicle body side and the axle side tube 12 is coupled to an axle. An upper opening end of the vehicle body side tube 11 is closed and sealed by a cap 30 and a fork bolt 31. The guide cylinder 21 is coupled to and suspended from a lower end portion of the cap 30. A waggle stopper collar 21A is attached to a lower end side outer circumferential portion of the guide cylinder 21. An annular gap is formed between the waggle stopper collar 21A and the inner circumference of the axle side tube 12.

A fitting section 32A (32B is an axle support hole) of the axle bracket 32 is screwed onto the lower end portion of the axle side tube 12 and sealed. A bottom piece 33 is held between the lower end face of the axle side tube 12 and a bottom surface of the axle bracket 32. A lower end portion of the guide rod 22 is erected in a center portion of the axle bracket 32 in the inside of the axle side tube 12. The lower end portion of the guide rod 22 is screwed into a bottom bolt 34 which is inserted into a bottom portion of the axle bracket 32 from the outer side and sealed. The lower end portion of the guide rod 22 is fixed by a lock nut 35. The guide rod 22 is slidably supported by a bush 37 of a rod guide 36 screwed onto a lower opening end of the guide cylinder 21 and is inserted into an inside of the guide cylinder 21. A guide 23 is screwed into the distal end portion of the guide rod 22 which is inserted into the inside of the guide cylinder 21.

The spring leg 10 includes an inner side air spring chamber 50 defined by the distal end guide 23 of the guide rod 22 inside the guide cylinder 21 and an outer side air spring chamber 60 defined by the vehicle body side tube 11 and the axle side tube 12 on the outer side of the inner side air spring chamber 50 in the guide cylinder 21. The spring leg 10 includes a rebound air spring chamber 70 formed between the rod guide 36, which is provided in the guide cylinder 21 and in which the guide rod 22 is inserted and supported, and the distal end guide 23 of the guide rod 22 inserted into the guide cylinder 21 inside of the guide cylinder 21. Consequently, in the spring leg 10, a suspension spring 40 is configured by an air spring of the inner side air spring chamber 50, an air spring of the outer side air spring chamber 60, and an air spring of the rebound air spring chamber 70.

The inner side air spring chamber 50 is formed between the fork bolt 31 and the distal end guide 23 of the guide rod 22 on the inside of a side where the guide rod 22 is absent in the guide cylinder 21. The inner side air spring chamber 50 is hermetically sealed by a seal member 51 provided in the distal end guide 23 with respect to the inner circumference of the guide cylinder 21 and a seal member 52 provided in the fork bolt 31 with respect to the inner circumference of the cap 30. In this embodiment, the guide cylinder 21 is configured by fitting an upper end outer circumference of a lower cylinder 21L in a lower end inner circumference of an upper cylinder 21U. A seal member 21S interposed in a fitting portion of the upper and lower cylinders 21U and 21L also hermetically seals the inner side air spring chamber 50 (FIG. 1).

An air pressure in the inner side air spring chamber 50 is adjusted by an inner side air pressure adjusting section 53. The inner side air pressure adjusting section 53 is configured by an air valve attached to an outside-facing position of the fork bolt 31 and communicating with the inner side air spring chamber 50. The inner side air pressure adjusting section 53 adjusts a charged air pressure in the inner side air spring chamber 50. The inner side air pressure adjusting section 53 may be formed of a rubber film through which a needle of an air pressure injector can pierce.

The outer side air spring chamber 60 is a space defined by the vehicle body side tube 11 and the axle side tube 12 on the outer side of the guide cylinder 21. The vehicle body side tube 11 and the axle side tube 12 hermetically slide via the seal member 13C in a sliding portion of the tubes. An upper part of the outer side air spring chamber 60 is hermetically sealed by a seal member 61A provided in the cap 30 with respect to the inner circumference of the vehicle body side tube 11 and a seal member 61B provided in the fork bolt 31 with respect to the inner circumference of the cap 30. A lower part of the outer side air spring chamber 60 is hermetically sealed by seal members 63A and 63B provided in the bottom piece 33 with respect to the inner circumference of the axle side tube 12 and the bottom surface of the axle bracket 32 and seal members 64A and 64B provided in the bottom bolt 34 with respect to the inner circumference of the axle bracket 32. The outer side air spring chamber 60 is hermetically sealed by the seal member 65 provided in the rod guide 36 with respect to the outer circumference of the guide rod 22.

An air pressure in the outer side air spring chamber 60 is adjusted by an outer side air pressure adjusting section 67. The outer side air pressure adjusting section 67 is configured by an air valve attached to an outside-facing position of the fork bolt 31. The outer side air pressure adjusting section 67 communicates with the outer side air spring chamber 60 and adjusts a charged air pressure in the outer side air spring chamber 60. The outer side air pressure adjusting section 67 may be formed of the rubber film through which the needle of the air pressure injector can pierce.

In the spring leg 10, the air springs are respectively formed by the inner side air spring chamber 50 and the outer side air spring chamber 60 compressed in a compression side stroke. A spring force F1 of the air spring of the inner side air spring chamber 50 and a spring force F2 of the air spring of the outer side air spring chamber 60 urge the vehicle body side tube 11 and the axle side tube 12 in a direction for extending the tubes.

In the spring leg 10, an oil chamber in which lubricant oil is filled can be formed in a lower part of the outer side air spring chamber 60. The lubricant oil lubricates the sliding portion of the vehicle body side tube 11 and the axle side tube 12 and a sliding portion of the guide cylinder 21 and the guide rod 22.

As explained above, the spring leg 10 includes the rebound air spring chamber 70 formed between the rod guide 36, which is provided in the guide cylinder 21 and which the guide rod 22 is inserted in and supported by, and the distal end guide 23 of the guide rod 22 inserted into the guide cylinder 21 inside of the guide cylinder 21. The rebound air spring chamber 70 is hermetically sealed by a seal member 71 provided in the distal end guide 23 with respect to the inner circumference of the guide cylinder 21, a seal member 72 provided in the rod guide 36 with respect to the outer circumference of the guide rod 22, and a seal member 73 provided in the rod guide 36 with respect to the inner circumference of the guide cylinder 21. Reference numeral 72A denotes a seal retainer. Reference numeral 72B denotes a rubber stopper retained by the seal retainer 72A. When the guide rod 22 and the distal end guide 23 perform an extension stroke with respect to the guide cylinder 21, the rubber stopper 72B comes into contact with the distal end guide 23 and limits a full extension stroke end of the distal end guide 23. In this embodiment, the rebound air spring chamber 70 communicates with a hollow portion 22A of the guide rod 22 as explained below, and the lower end portion of the guide rod 22 is screwed into the bottom bolt 34. Consequently, a seal member 74 provided in the guide rod 22 with respect to the inner circumference of the bottom bolt 34 also hermetically seals the rebound air spring chamber 70.

In the spring leg 10, an air spring is formed by the rebound air spring chamber 70 compressed on the full extension side of the extension side stroke. The rebound air spring chamber 70 is compressed on the full extension side where the vehicle body side tube 11 and the axle side tube 12 are urged by the spring forces F1 and F2 of the air springs of the inner side air spring chamber 50 and the outer side air spring chamber 60. A spring force F3 of the air spring of the rebound air spring chamber 70 urges, resisting the spring force F1 of the air spring of the inner side air spring chamber 50 and the spring force F2 of the air spring of the outer side air spring chamber 60, the vehicle body side tube 11 and the axle side tube 12 in a direction for contracting the tubes.

Therefore, in the front fork, with respect to extension and compression strokes of the spring leg 10, the spring force F1 of the air spring of the inner side air spring chamber 50 and the spring force F2 of the air spring of the outer side air spring chamber 60, which urge the vehicle body side tube 11 and the axle side tube 12 in the direction for extending the tubes, and the spring force F3 of the air spring of the rebound air spring chamber 70, which urges the vehicle body side tube 11 and the axle side tube 12 in the direction for contracting the tubes on the full extension side, generate a combined spring force F, which is a sum of the forces. The combined spring force F increases a spring force in a latter half on the compression side without increasing a spring force in initial to intermediate regions on the full extension side of the expansion and compression strokes.

Therefore, the spring leg 10 includes a configuration explained below in order to stably maintain an air spring characteristic.

In the spring leg 10, as explained above, the inner side air spring chamber 50 defined by the distal end guide 23 of the guide rod 22 is formed on the inside of the guide cylinder 21. In the configuration, the piston ring 24 and the seal members 51 and 71 coming into slide contact with the inner circumference of the guide cylinder 21 are provided in the outer circumference of the distal end guide 23 of the guide rod 22.

Figure 4:
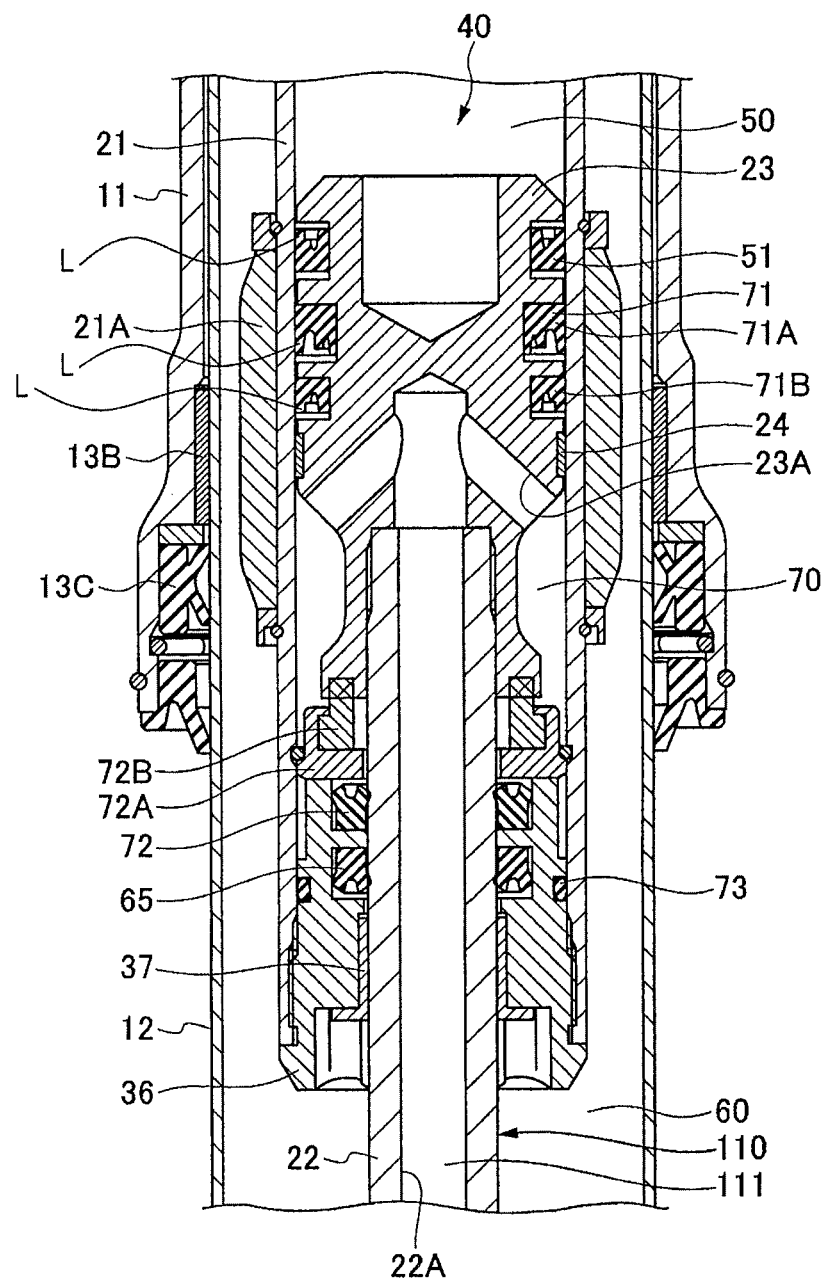
FIG. 4 is an intermediate part enlarged sectional view of FIG. 1.

In the spring leg 10, on the outer circumference of the distal end guide 23 of the guide rod 22, as shown in FIG. 4, the inward seal member 51, the outward seal member 71, and the piston ring 24 are provided in order from a near side to a far side of the inner side air spring chamber 50 along an axial direction of the distal end guide 23. In this embodiment, adjacent two (or three or more) outward seal members 71A and 71B are provided as the outward seal member 71. The outward seal members 71A and 71B are provided in two positions in the axial direction in the outer circumference of the distal end guide 23. The inward seal member 51, the outward seal members 71A and 71B, and the piston ring 24 are fitted in annular grooves respectively provided in four positions in the axial direction of the outer circumference of the distal end guide 23. As the inward seal member 51, adjacent two (or three or more) inward seal members (not shown in the figure) may be provided.

In the inward seal member 51, a lip L configured to come into slide contact with the inner circumference of the guide cylinder 21 is directed to the side of the inner side air spring chamber 50. In each of the outward seal members 71A and 71B, a lip L configured to come into slide contact with the inner circumference of the guide cylinder 21 is directed to the opposite side of the inner side air spring chamber 50 (a side of a space 70).

Further, the spring leg 10 includes a configuration explained below in order to expand the capacity of the rebound air spring chamber 70 and ensure a stable rebound reaction force (spring force F3).

Figure 3:
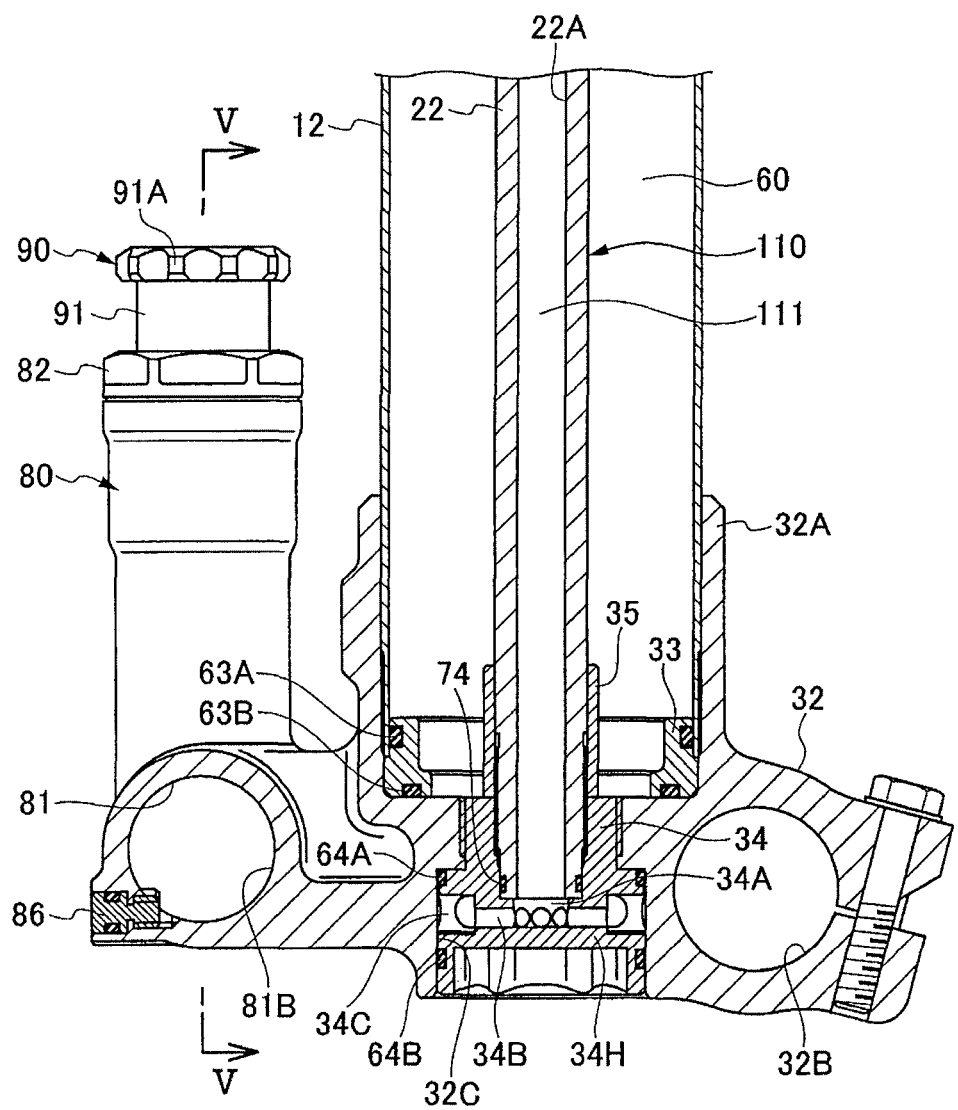
FIG. 3 is a lower part enlarged sectional view of FIG. 1.

In the spring leg 10, as shown in FIGS. 1 and 3, a sub-tank 80 including an air chamber 81 communicating with the rebound air spring chamber 70 is provided on the outside of the vehicle body side tube 11 and the axle side tube 12. In this embodiment, the sub-tank 80 is provided by being integrally molded with the fitting section 32A of the axle bracket 32 screwed onto the lower end portion of the axle side tube 12.

Figure 5:
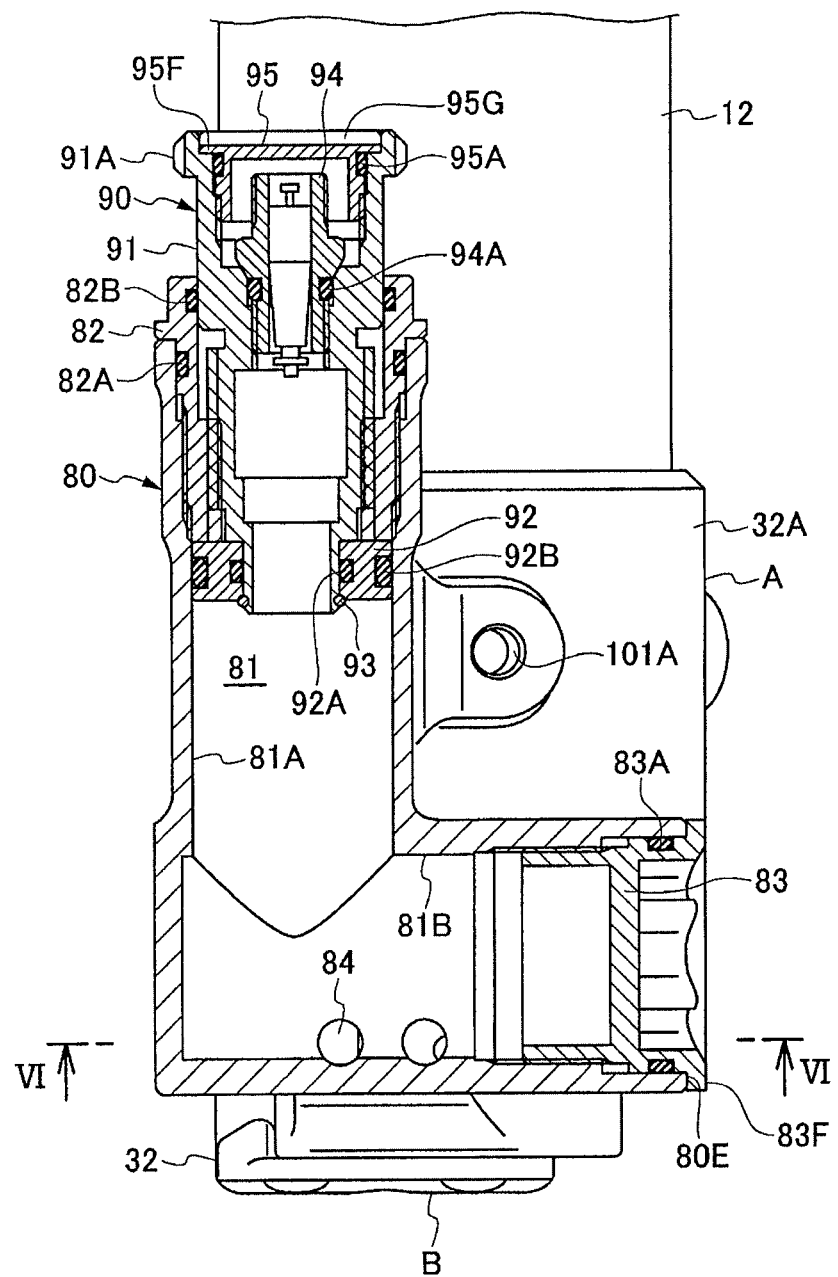
FIG. 5 is a sectional view taken along line V-V of FIG. 3.
Figure 6:
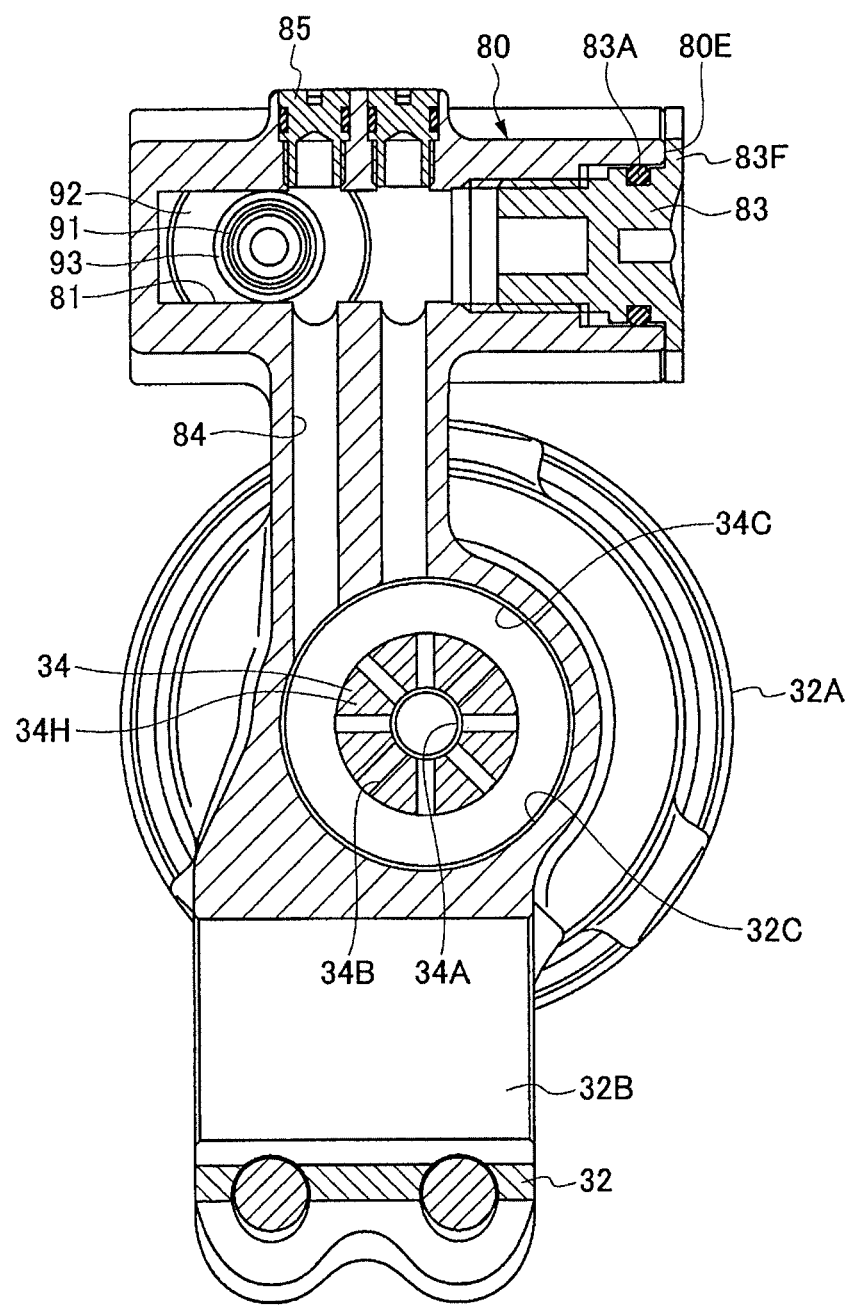
FIG. 6 is a sectional view taken along line VI-VI of FIG. 5.
Figure 7:
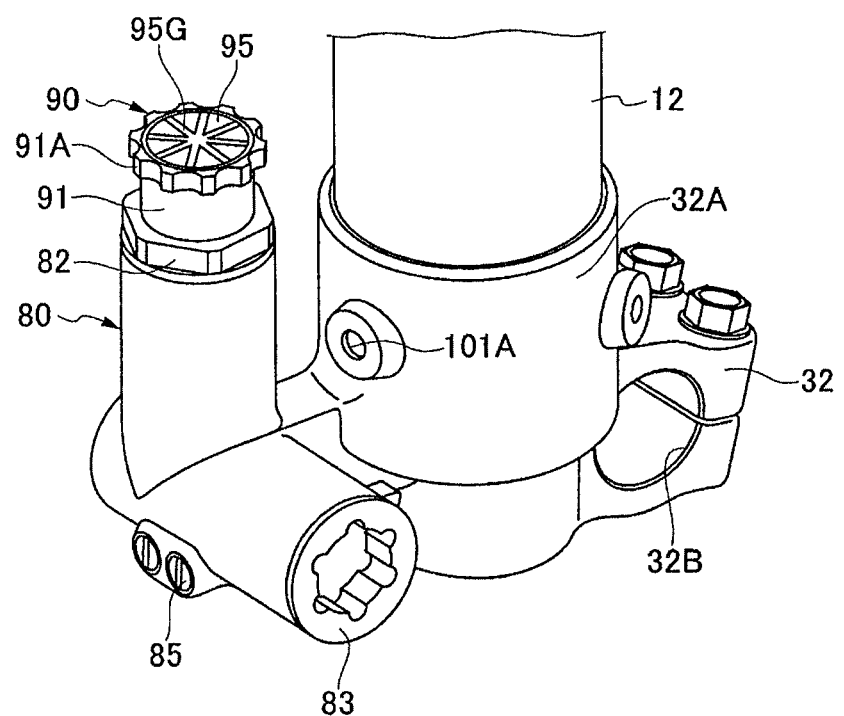
FIG. 7 is a lower part perspective view of the spring leg.
Figure 8:
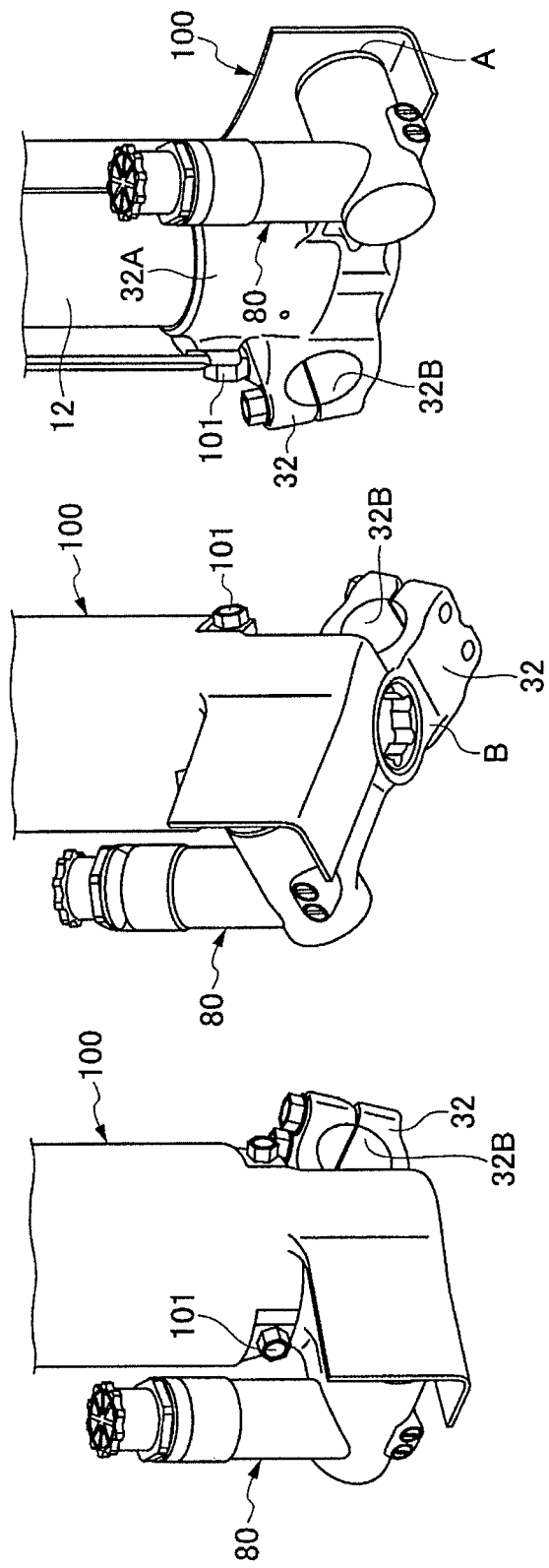
FIGS. 8A to 8C are perspective views showing an axle side tube and a protection cover of a sub-tank.

As shown in FIGS. 3, 5, and 6, the sub-tank 80 includes the air chamber 81 formed by connecting a longitudinal chamber 81A and a lateral chamber 81B in an L shape. A cap 82 is sealed via a seal member 82A and screwed into an opening portion of the longitudinal chamber 81A facing upward. An adjuster bolt 91 of a capacity adjusting device 90 explained below is screwed into the center portion of the cap 82 via a seal member 82B (FIG. 5). A plug bolt 83 is sealed via a seal member 83A and screwed into an opening portion of the lateral chamber 81B facing sideward (FIG. 5). At this point, a flange section 83F formed at the outer end of the plug bolt 83 abuts on an end face 80E of an opening portion of the sub-tank 80 and covers the end face 80E (FIG. 5).

The sub-tank 80 includes long hole-like communication ports 84 orthogonal to an axial direction of the lateral chamber 81B and opening on a bottom portion inner circumferential surface of the lateral chamber 81B. The communication ports 84 are opened to a bolt insertion hole 32C through which a head portion 34H of the bottom bolt 34 is inserted in the axle bracket 32. In this embodiment, two communication ports 84 are provided. However, only one communication port 84 may be provided as long as a necessary passage area can be ensured.

On the other hand, as shown in FIG. 3, the head portion 34H of the bottom bolt 34 includes, in a center portion, a bottomed center hole 34A, with which the lower end portion of the hollow portion 22A of the guide rod 22 communicates, includes a plurality of radial holes 34B extending in a radial direction from the center hole 34A, and includes, in the outer circumference, an annular groove 34C in which the outer ends of the radial holes 34B are opened. The communication ports 84 of the sub-tank 80 communicate with the annular groove 34C of the bottom bolt 34. In the bolt insertion hole 32C of the axle bracket 32 through which the head portion 34H of the bottom bolt 34 is inserted, the seal members 64A and 64B seals above and below the annular groove 34C, respectively.

Further, as shown in FIG. 4, an upper end portion of the hollow portion 22A of the guide rod 22 is communicated with the rebound air spring chamber 70 via a communication hole 23A perforated in the distal end guide 23 of the guide rod 22. Consequently, the air chamber 81 of the sub-tank 80 is communicated with the rebound air spring chamber 70 via the communication ports 84 of the sub-tank 80, the annular groove 34C, the radial hole 34B, and the center hole 34A of the bottom bolt 34, the hollow portion 22A of the guide rod 22, and the communication hole 23A of the distal end guide 23. The communication ports 84, the annular groove 34C, the radial hole 34B, the center hole 34A, and the communication hole 23A have a passage area equal to or larger than the hollow portion 22A of the guide rod 22, respectively.

The sub-tank 80 includes plug bolts 85 in machining holes for the communication ports 84 (FIG. 6) and includes a drain bolt 86 screwed into a drain hole opened on the bottom portion inner circumferential surface of the lateral chamber 81B (FIG. 3).

In the spring leg 10, viewed from a vehicle body front, the entire sub-tank 80 is arranged near the vehicle body center than an attaching section of the axle side tube 12 in the axle bracket 32, in this embodiment, than the fitting section 32A of the axle bracket 32. That is, viewed from the vehicle body front, a contour of the sub-tank 80 does not project from a side surface A on the vehicle body outer side (FIG. 5) of the fitting section 32A of the axle bracket 32.

A bottom portion of the sub-tank 80, in this embodiment, a bottom portion forming the lateral chamber 81B and the flange section 83F of the plug bolt 83 screwed into the opening portion of the lateral chamber 81B are arranged above a lower end face B (FIG. 5) of the axle bracket 32.

The capacity adjusting device 90 and an air supply and exhaust valve 94 included in the sub-tank 80 are explained below.

In the capacity adjusting device 90, as shown in FIG. 5, the adjuster bolt 91 is sealed by the seal member 82B and screwed into the center portion of the cap 82 screwed into the opening portion of the longitudinal chamber 81A facing upward in the sub-tank 80. The adjuster volt 91 includes an upward operation grip 91A projecting to the outer circumference at an outside-facing upper end portion and includes a piston 92 having a distal end portion, which is inserted into the air chamber 81, via a seal member 92A. The piston 92 includes a seal member 92B fixed by a stop ring 93 and coming into slide contact with an inner circumferential surface of the longitudinal chamber 81A. The air supply and exhaust valve 94 is sealed via a seal member 94A and screwed into the center hole portion of the adjuster bolt 91.

A valve cover 95 configured to cover the air supply and exhaust valve 94 is screwed into a center opening portion of the adjuster bolt 91 via a seal member 95A. An outer end flange section 95F (FIG. 5) of the valve cover 95 is fit in an inner circumference side step portion of the operation grip 91A in the adjuster bolt 91. The valve cover 95 includes a rotation operation groove 95G (FIG. 5) radially carved around a center of an outer surface.

The capacity adjusting device 90 can adjust the capacity of the air chamber 81 by screwing the adjuster bolt 91 and advancing and retracting the piston 92. The capacity adjusting device 90 can supply and exhaust the pressure in the air chamber 81 using the air supply and exhaust valve 94 and adjust the pressure.

In the spring leg 10, as shown in FIGS. 8A to 8C, a protection cover 100 configured to cover the entire sub-tank 80 is provided in the axle bracket 32. The protection cover 100 is fixed to the axle bracket 32 by bolts 101 screwed into screw holes 101A (FIG. 7) provided in the outer circumference of the fitting section 32A of the axle bracket 32. The protection cover 100 also integrally includes a portion that covers the axle side tube 12. However, the protection cover 100 may be separate from the portion that covers the axle side tube 12.

According to this embodiment, action and effects explained below are attained.

(a) In the spring leg 10, one air spring is formed by the inner side air spring chamber 50 compressed in the compression side stroke. The spring force F1 of the air spring of the inner side air spring chamber 50 urges the vehicle body side tube 11 and the axle side tube 12 in the direction for extending the tubes.

In the spring leg 10, another air spring is formed by the rebound air spring chamber 70 compressed on the full extension side of the extension side stroke. The spring force F3 of the air spring of the rebound air spring chamber 70 urges, resisting the spring force F1 of the air spring of the inner side air spring chamber 50, the vehicle body side tube 11 and the axle side tube 12 in the direction for contracting the tubes.

Therefore, in the front fork, with respect to the extension and compression strokes of the spring leg 10, the spring force F1 of the air spring of the inner side air spring chamber 50, which urges the vehicle body side tube 11 and the axle side tube 12 in the direction for extending the tubes, and the spring force F3 of the air spring of the rebound air spring chamber 70, which urges the vehicle body side tube 11 and the axle side tube 12 in the direction for contracting the tubes, generate the combined spring force F, which is a sum of the forces. The combined spring force F increases a spring force in a latter half on the compression side without increasing a spring force in initial to intermediate regions on the full extension side of the expansion and compression strokes.

At this point, the sub-tank 80 including the air chamber 81 communicating with the rebound air spring chamber 70 is provided. The sub-tank 80 can expand the capacity of the rebound air spring chamber 70 and reduce a compression ratio even under a high-pressure state. Therefore, near the full extension of the extension side stroke, the rebound reaction force (the spring force F3) is stabilized and the steering stability is improved.

(b) In the spring leg 10, like the inner side air spring chamber 50, still another air spring is also formed by the outer side air spring chamber 60 compressed in the compression side stroke. The spring force F1 of the air spring of the inner side air spring chamber 50, the spring force F2 of the air spring of the outer side air spring chamber 60, and the spring force F3 of the air spring of the rebound air spring chamber 70 generate the combined spring force F, which is a sum of the spring forces.

(c) The sub-tank 80 is provided outside the vehicle body side tube 11 and the axle side tube 12. Therefore, irrespective of the sizes of the vehicle body side tube 11 and the axle side tube 12, the sub-tank 80 including the air chamber 81 having a certain capacity can be ensured on the outside of the tubes. Further, it is possible to easily expand the capacity of the rebound air spring chamber 70.

(d) The sub-tank 80 is provided in the axle bracket 32 attached to the lower end portion of the axle side tube 12. When the guide rod 22 is erected in the axle bracket 32, the air chamber 81 of the sub-tank 80 easily communicates with the rebound air spring chamber 70 via the communication passage (the communication port 84 of the sub-tank 80, the center hole 34A, the radial hole 34B, and the annular groove 34C of the bottom bolt 34 provided in the axle bracket 32) provided in the axle side tube 12, the hollow portion 22A provided in the guide rod 22, and the communication hole 23A provided in the guide 23.

In the spring leg 10 in the first embodiment, the hollow portion 22A of the guide rod 22 communicates with the rebound air spring chamber 70 as explained above and expands the capacity of the rebound air spring chamber 70. That is, the guide rod 22 can be considered to configure a sub-tank 110 provided on the inside of the vehicle body side tube 11 and the axle side tube 12. The sub-tank 110 can be considered to configure an air chamber 111 configured to communicate with the rebound air spring chamber 70 through the hollow portion 22A of the guide rod 22.

Therefore, according to this embodiment action and effects explained below are further attained.

(e) The sub-tank 110 is provided inside the vehicle body side tube 11 and the axle side tube 12. Therefore, irrespective of the configuration on the outside of the vehicle body side tube 11 and the axle side tube 12, the sub-tank 110 including the air chamber 111 having a certain capacity can be ensured on the inside of the tubes. Further, it is possible to easily expand the capacity of the rebound air spring chamber 70.

(f) The sub-tank 110 is provided in the guide rod 22 surrounded by the rebound air spring chamber 70. Therefore, the air chamber 111 of the sub-tank 110 is easily communicated with the rebound air spring chamber 70. The air chamber 111 of the sub-tank 110 is easily communicated with the rebound air spring chamber 70 via the communication hole 23A perforated in the guide 23.

(g) The sub-tanks 80 and 110 are provided on both the outside and the inside of the vehicle body side tube 11 and the axle side tube 12. With sub-tanks 80 and 110 provided on the inside and the outside of the vehicle body side tube 11 and the axle side tube 12, it is possible to expand a total capacity of the air chambers 81 and 111 formed by the sub-tanks 80 and 110 and further expand the capacity of the rebound air spring chamber 70.

Figure 9:
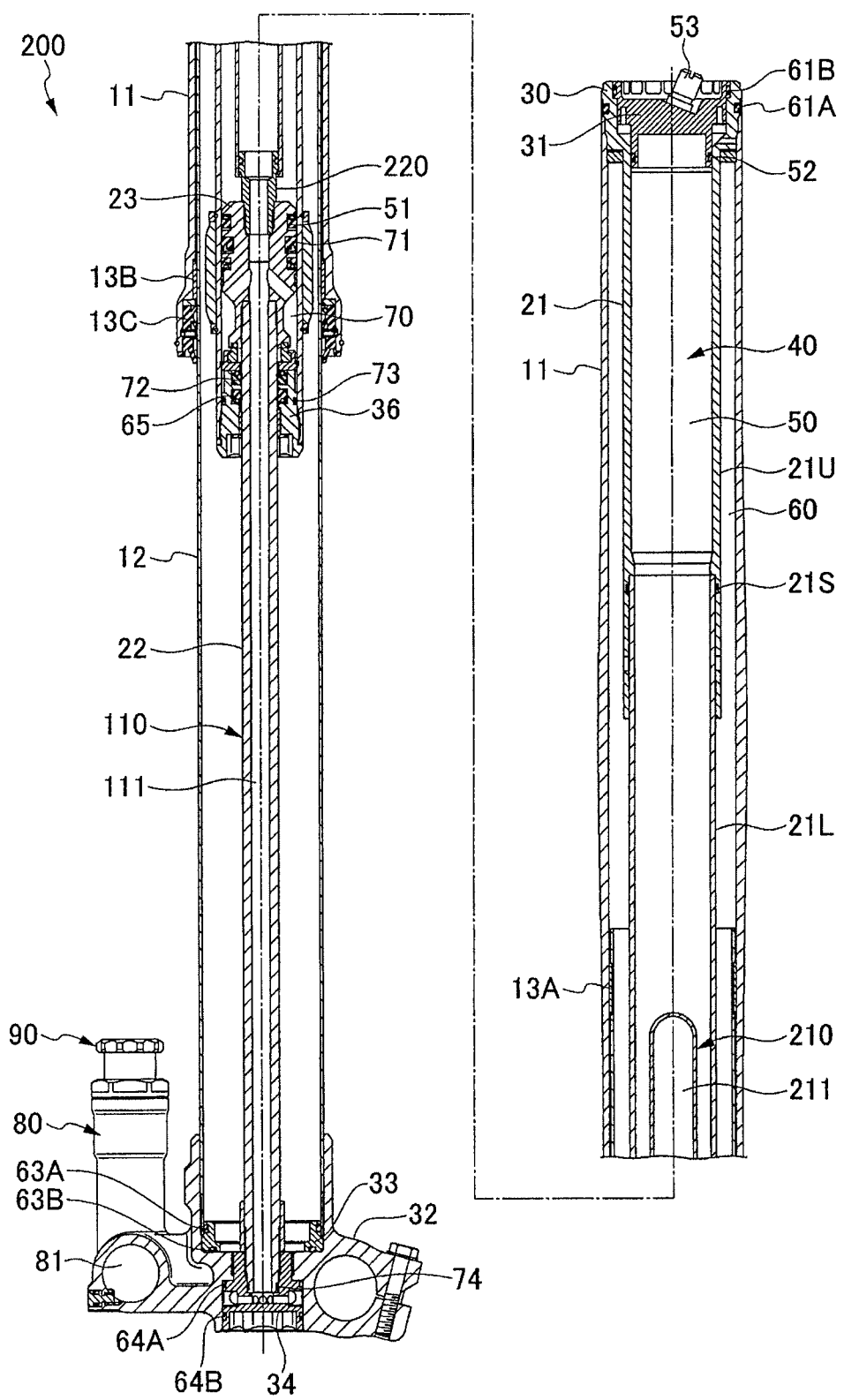
FIG. 9 is a sectional view showing an entire spring leg in a second embodiment.
Figure 10:
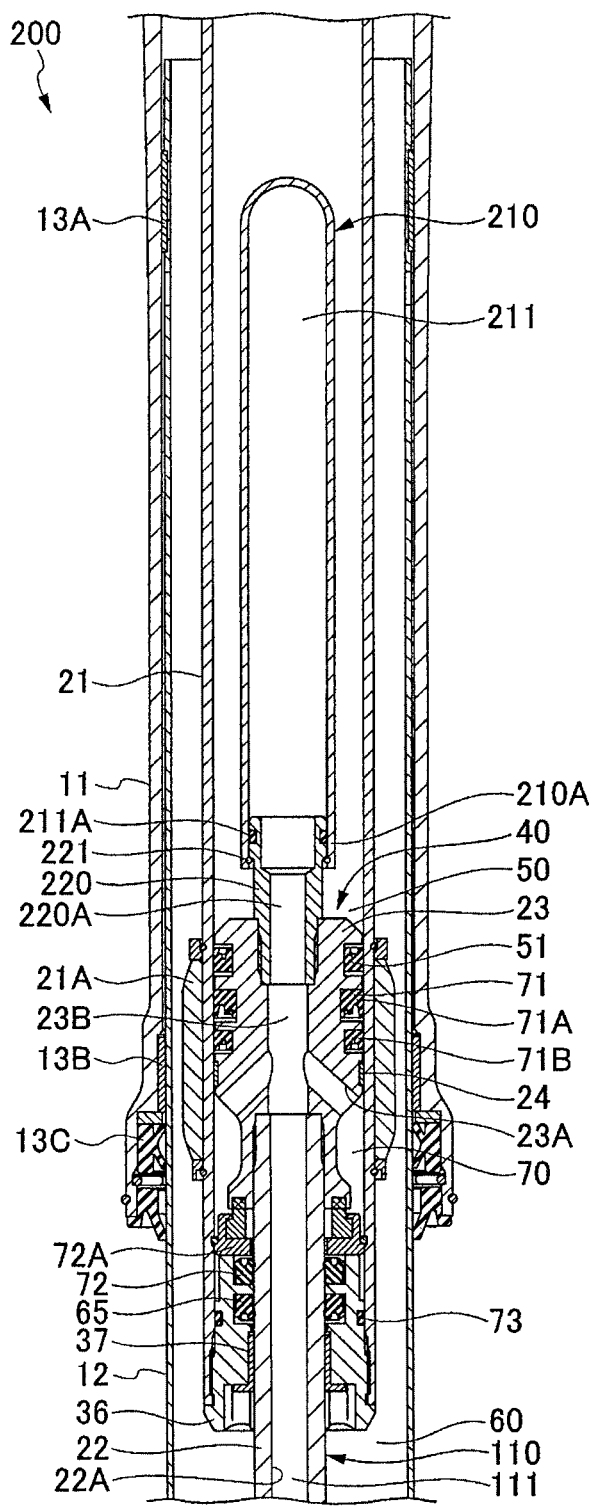
FIG. 10 is a main part enlarged sectional view of FIG. 9.

(Second Embodiment) (FIGS. 9 and 10)

A spring leg 200 in a second embodiment is different from the spring leg 10 in the first embodiment in that a sub-tank 210 is further provided on the inside of the vehicle body side tube 11 and the axle side tube 12.

The sub-tank 210 is made of, for example, a metal pipe connected to a connection pipe 220 screwed onto the distal end guide 23 of the guide rod 22, and includes an air chamber 211. The air chamber 211 of the sub-tank 210 is communicated with the rebound air spring chamber 70 via communication holes 23A and 23B perforated in the distal end guide 23 and communicating with the rebound air spring chamber 70 and a communication passage 220A of the connection pipe 220. An opening portion 210A of the sub-tank 210 is hermetically connected to the connection pipe 220 by a seal member 211A provided in the outer circumference of the connection pipe 220 and prevented from coming off by a stopper ring 221 provided in the outer circumference of the connection pipe 220.

According to this embodiment, actions and effects explained below are attained in addition to the action and effects of (a) to (g) in the first embodiment.

(i) The sub-tanks 110 and 210 are provided on the inside of the vehicle body side tube 11 and the axle side tube 12. Therefore, irrespective of the configuration on the outside of the vehicle body side tube 11 and the axle side tube 12, the sub-tanks 110 and 210 including the air chambers 111 and 211 having a certain capacity can be ensured on the inside of the tubes. Further, it is possible to easily expand the capacity of the rebound air spring chamber 70.

(ii) The sub-tank 210 is provided in the guide 23 of the guide rod 22 configured to define the rebound air spring chamber 70. Therefore, the air chamber 211 of the sub-tank 210 is easily communicated with the rebound air spring chamber 70 via the communication holes 23A and 23B perforated in the guide 23.

(iii) The sub-tank 110 is provided in the guide rod 22 surrounded by the rebound air spring chamber 70. Therefore, the air chamber 111 of the sub-tank 110 is easily communicated with the rebound air spring chamber 70 via the communication hole 23A perforated in the guide 23.

(iv) The sub-tanks 80, 110, and 210 are provided on both the outside and the inside of the vehicle body side tube 11 and the axle side tube 12, With the sub-tanks 80, 110, and 210 provided on the inside and the outside of the vehicle body side tube 11 and the axle side tube 12, it is possible to expand a total capacity of the air chambers 81, 111, and 211 formed by the sub-tanks 80, 110, and 210 and further expand the capacity of the rebound air spring chamber 70.

Figure 11:
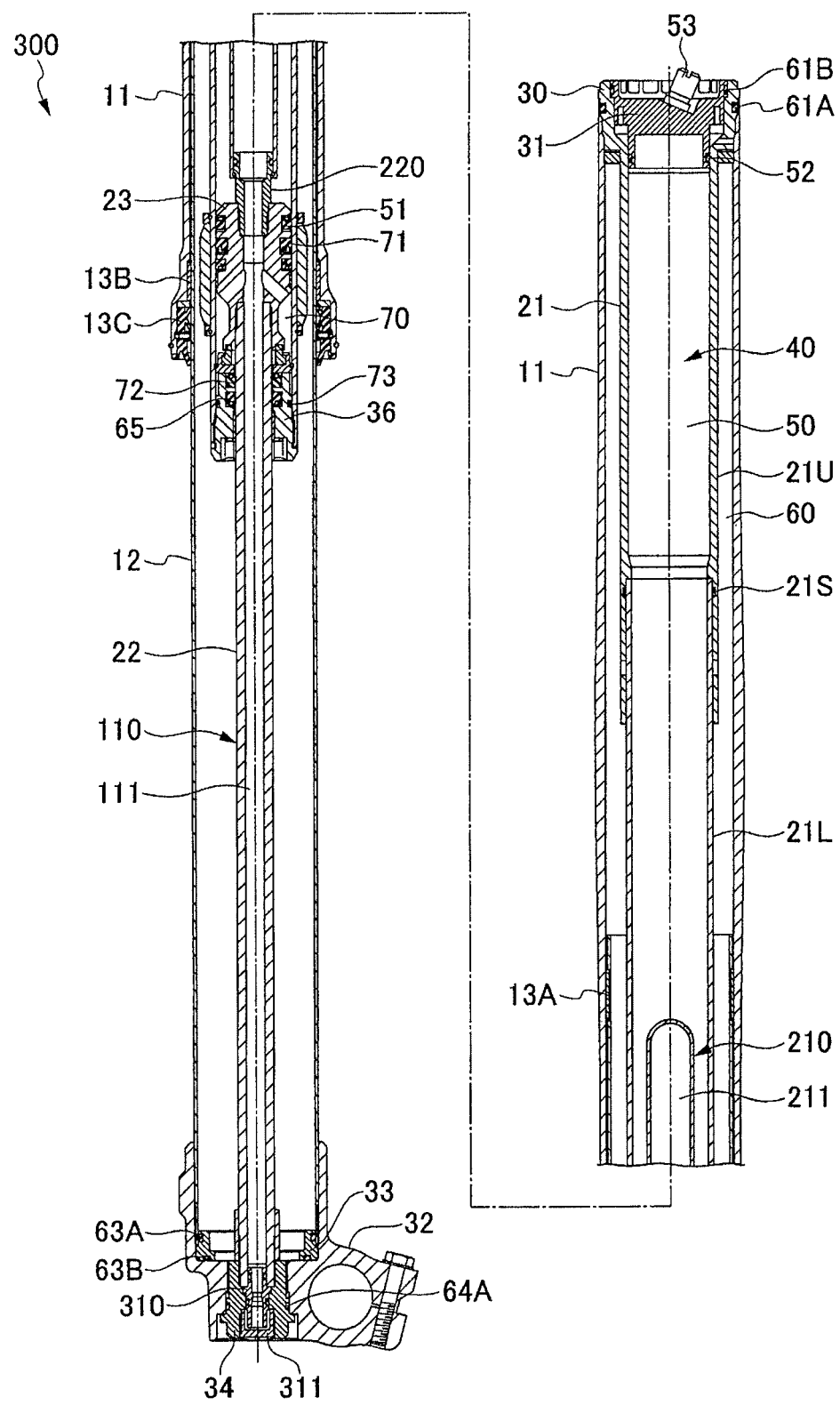
FIG. 11 is a sectional view showing an entire spring leg in a third embodiment.
Figure 12:
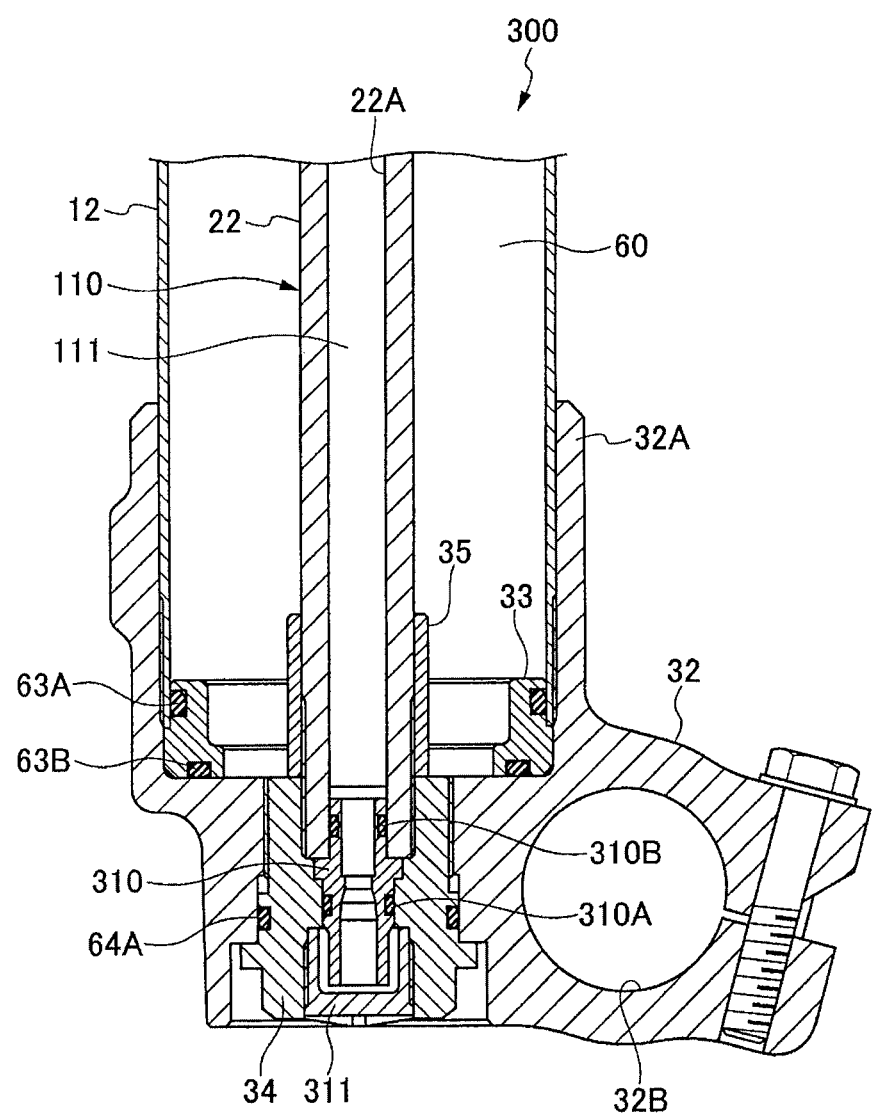
FIG. 12 is a main part enlarged sectional view of FIG. 11.

(Third Embodiment) (FIGS. 11 and 12)

A spring leg 300 in a third embodiment is different from the spring leg 200 in the second embodiment in that the sub-tank 80 on the outside of the vehicle body side tube 11 and the axle side tube 12 is removed. That is, in the spring leg 300, the sub-tanks 110 and 210 are provided on the inside of the vehicle body side tube 11 and the axle side tube 12.

The spring leg 300 includes an air supply and exhaust valve 310 configured to adjust pressures in the air chambers 111 and 211 of the sub-tanks 110 and 210. That is, the air supply and exhaust valve 310 is sealed via a seal member 310A and mounted on the bottom bolt 34, which is inserted into the bottom portion of the axle bracket 32 from the outer side and sealed and with which the lower end portion of the guide rod 22 is screwed. The air supply and exhaust valve 310 is sealed via a seal member 310B and inserted into the hollow portion 22A of the guide rod 22 as well. The air supply and exhaust valve 310 is caused to directly face the hollow portion 22A (the air chamber 111) of the guide rod 22. A valve cover 311 configured to cover the air supply and exhaust valve 310 is screwed into the bottom bolt 34. It is possible to change setting of an air pressure of the rebound air spring chamber 70 and change setting of the total length and riding height posture using the air supply and exhaust valve 310.

Figure 13:
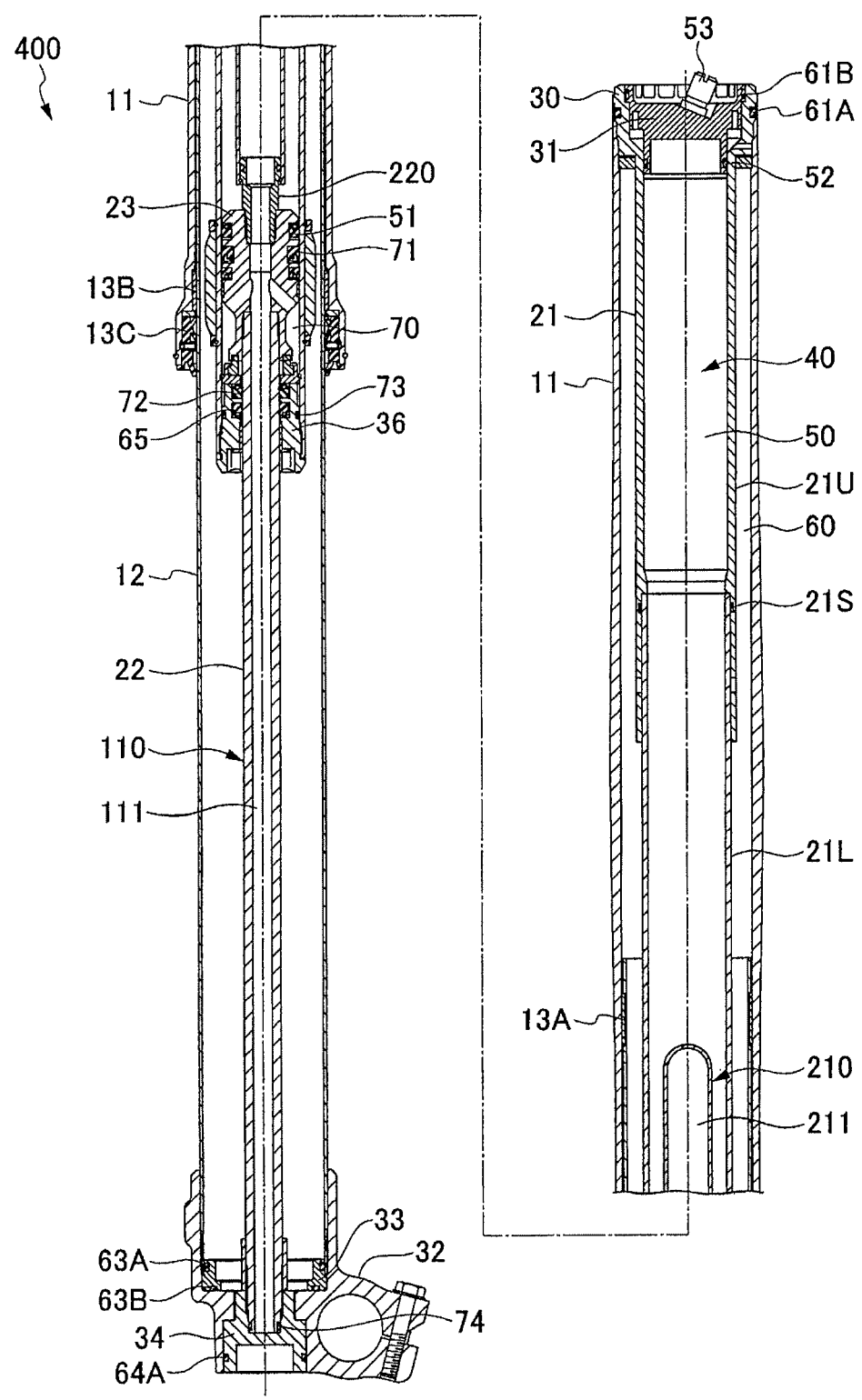
FIG. 13 is a sectional view showing an entire spring leg in a fourth embodiment.
Figure 14:
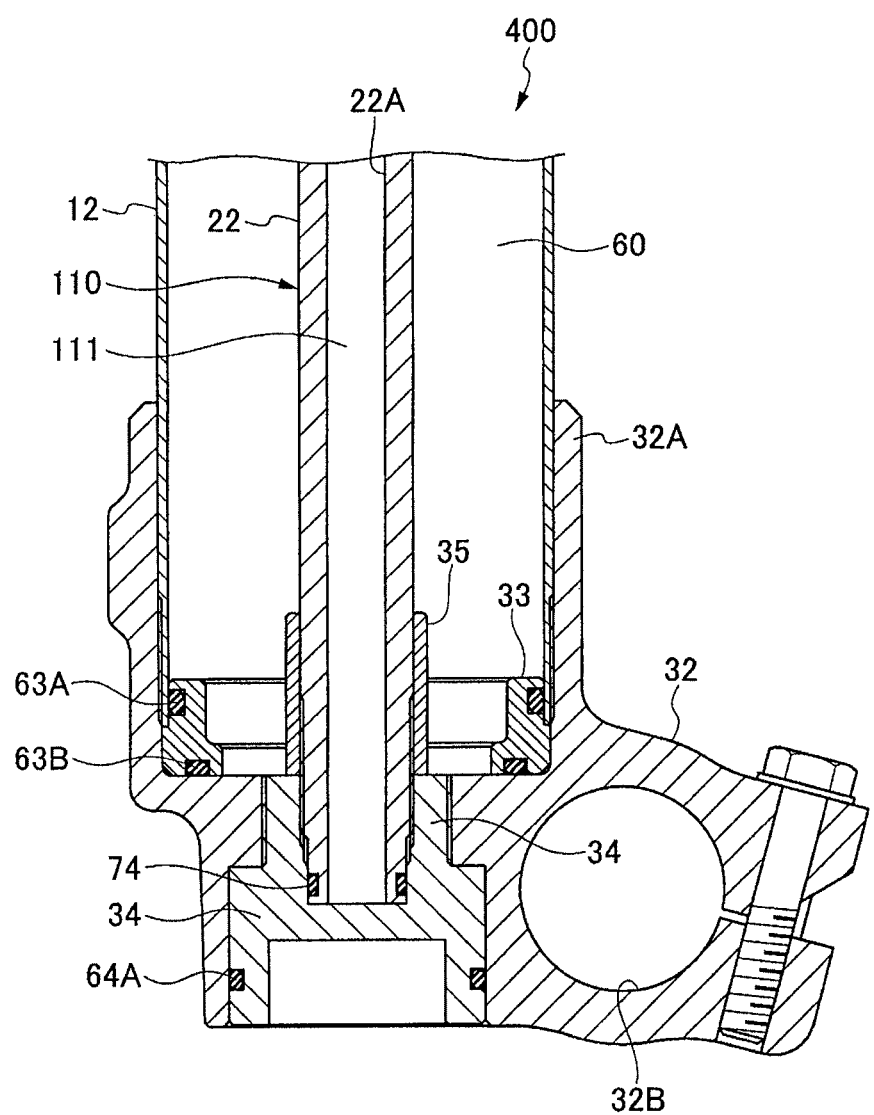
FIG. 14 is a main part enlarged sectional view of FIG. 13.

Fourth Embodiment) (FIGS. 13 and 14)

A spring leg 400 in a fourth embodiment is different from the spring leg 300 in the third embodiment in that the air supply and exhaust valve 310 for adjusting the pressures in the air chambers 111 and 211 of the sub-tanks 110 and 210 is removed.

Figure 15:
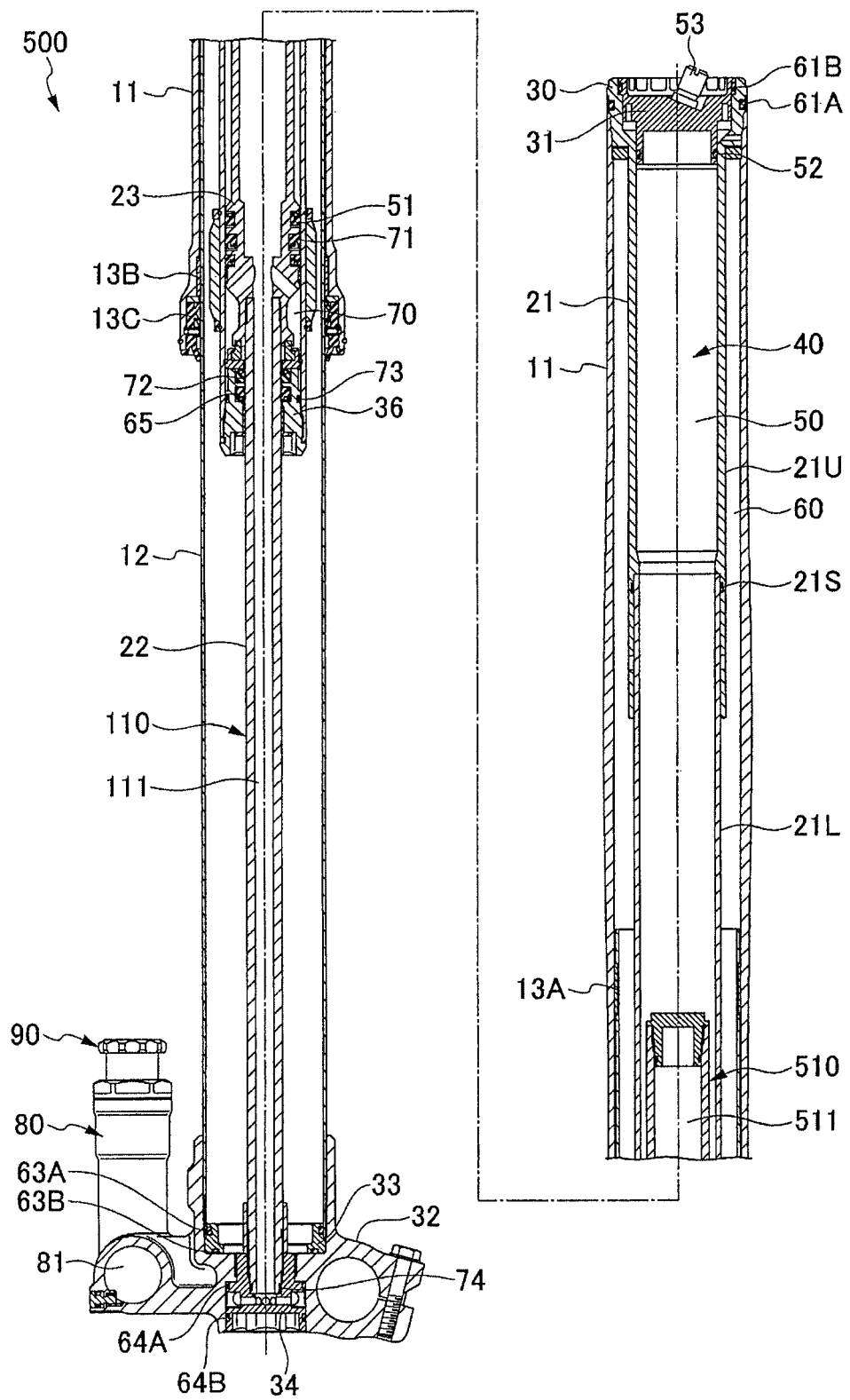
FIG. 15 is a sectional view showing an entire spring leg in a fifth embodiment.
Figure 16:
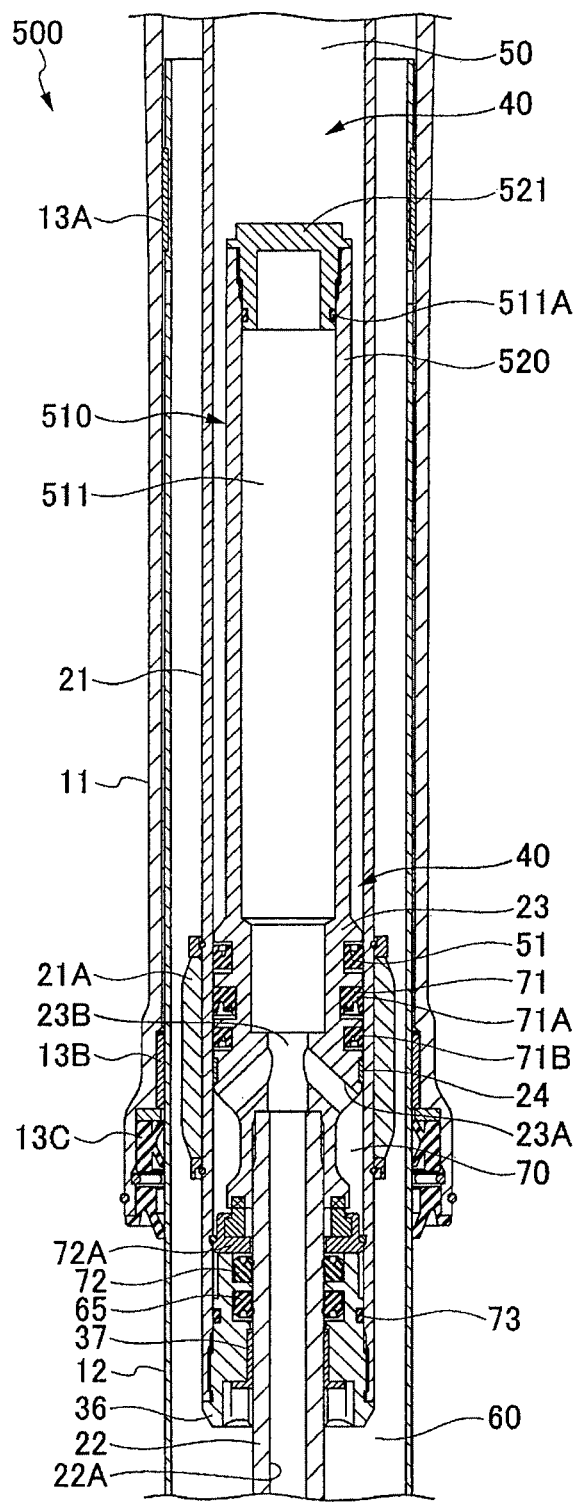
FIG. 16 is a main part enlarged sectional view of FIG. 15.

(Fifth Embodiment) (FIGS. 15 and 16)

A spring leg 500 in a fifth embodiment is different from the spring leg 200 in the second embodiment in that a sub-tank 510 replacing the sub-tank 210 provided in the distal end guide 23 of the guide rod 22 is provided on the inside of the vehicle body side tube 11 and the axle side tube 12.

In the sub-tank 510, an upper end side of the distal end guide 23 of the guide rod 22 is extended in the axial direction as a cylindrical section 520. An air chamber 511 defined inside the cylindrical section 520 is hermetically sealed by a plug 521 fitted in an opening end of the cylindrical section 520 via a seal member 511A. The air chamber 511 of the sub-tank 510 is communicated with the rebound air spring chamber 70 via the communication holes 23A and 23B perforated in the distal end guide 23 and communicating with the rebound air spring chamber 70.

Figure 17:
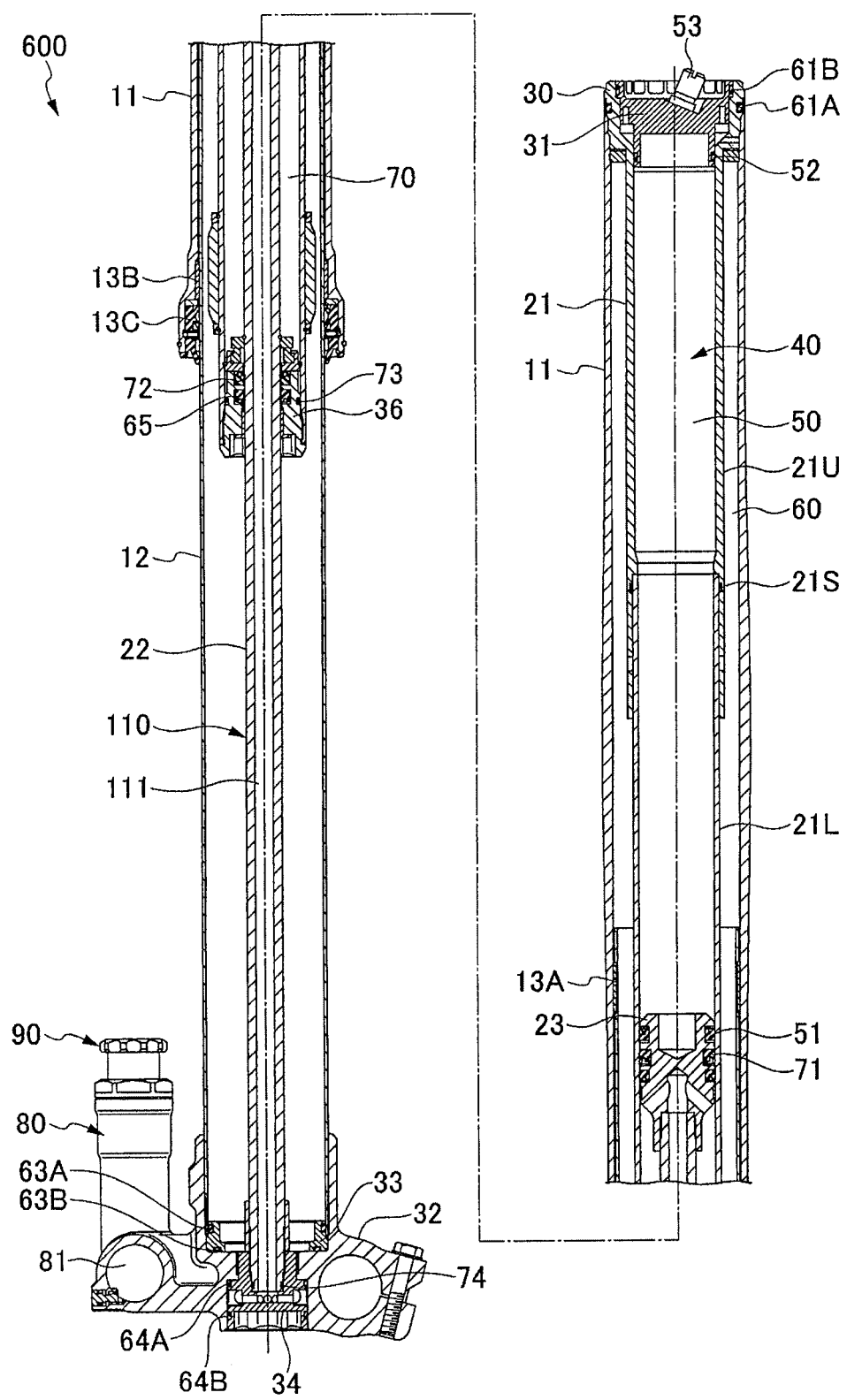
FIG. 17 is a sectional view showing an entire spring leg in a sixth embodiment.
Figure 18:
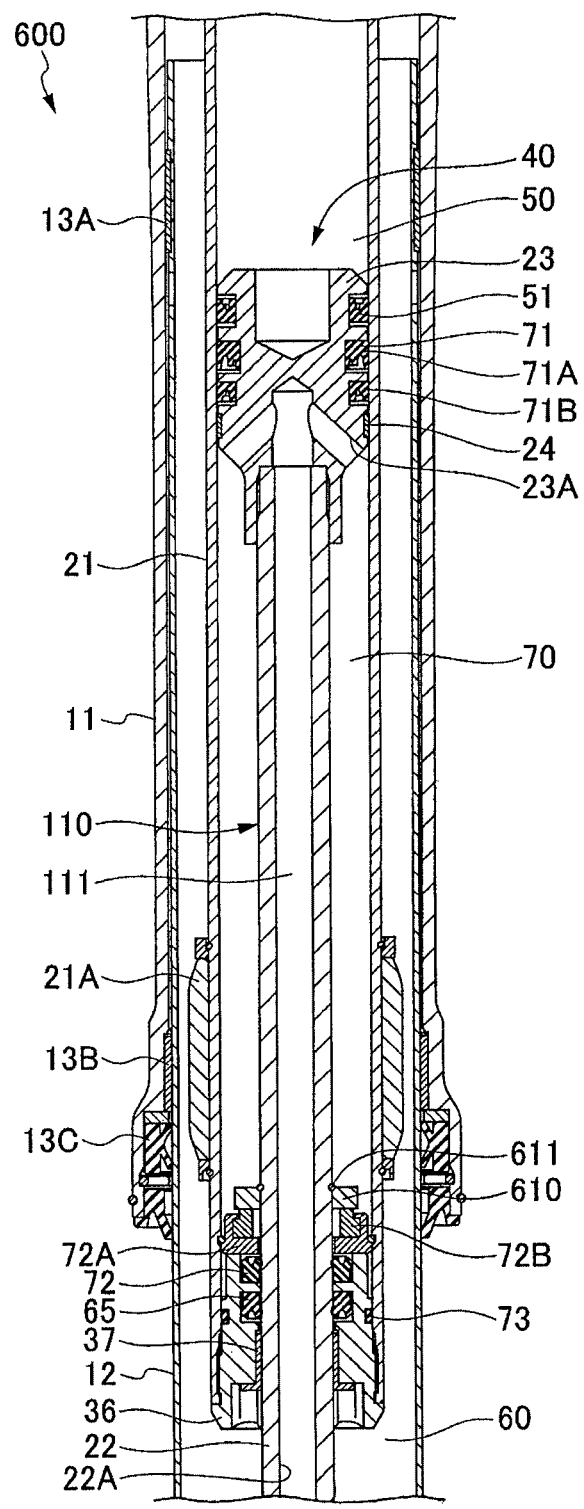
FIG. 18 is a main part enlarged sectional view of FIG. 17.

(Sixth Embodiment) (FIGS. 17 and 18)

A spring leg 600 in a sixth embodiment is different from the spring leg 10 in the first embodiment in that the capacity of the rebound air spring chamber 70 is expanded. That is, the guide 23 is provided at the distal end portion of the guide rod 22 and a stopper collar 610 is provided in an intermediate portion of the guide rod 22 separated from the distal end guide 23 in the axial direction by a certain length. At a full extension stroke end to which the guide rod 22 and the distal end guide 23 perform an extension stroke with respect to the guide cylinder 21, the stopper collar 610 locked to the guide rod 22 by a stopper ring 611 comes to a stop at the rubber stopper 72B on the side of the rod guide 36. Compared with the capacity of the rebound air spring chamber 70 obtained when the distal end guide 23 directly comes to a stop at the rubber stopper 72B, the capacity of the rebound air spring chamber 70 formed between the rod guide 36 and the distal end guide 23 on the inside of the guide cylinder 21 is expanded by the separation length between the distal end guide 23 and the stopper collar 610.

The embodiment of the present invention are explained in detail above. However, the specific configuration of the present invention is not limited to the embodiments. Design changes and the like not departing from the spirit of the present invention are included in the present invention.

INDUSTRIAL APPLICABILITY

The present invention is a spring leg of a front fork not incorporating a suspension spring made of a metal spring but incorporating a suspension spring made of an air spring, a vehicle body side tube and an axle side tube being slidably engaged, a guide cylinder being provided in a center portion on the inside of one of the vehicle body side tube and the axle side tube, and a guide of a guide rod provided in the center portion on an inside of the other of the vehicle body side tube and the axle side tube being inserted into the guide cylinder, the spring leg including an inner side air spring chamber defined by the guide of the guide rod on the inside of the guide cylinder and including a rebound air spring chamber formed between a rod guide, which is provided in the guide cylinder and in which the guide rod is inserted and supported, and the guide of the guide rod inserted into the guide cylinder on the inside of the guide cylinder, wherein a sub-tank including an air chamber communicating with the rebound air spring is provided. Consequently, in the spring leg of the front fork, it is possible to expand the capacity of the rebound air spring chamber and ensure a stable rebound reaction force.

What is claimed is:

1. A spring leg of a front fork comprising:
a vehicle body side tube;
an axle side tube being slidably engaged with the vehicle body side tube;
a guide cylinder being provided in a center portion inside one of the vehicle body side tube and the axle side tube;
a guide rod provided in a center portion inside the other of the vehicle body side tube and the axle side tube where the guide rod has a guide being inserted into the guide cylinder;
a rod guide which is provided in the guide cylinder where the guide rod is inserted in and supported by the rod guide;
a suspension spring being composed of;
an inner side air spring chamber defined by the guide of the guide rod inside the guide cylinder, and
a rebound air spring chamber formed between the rod guide, and the guide of the guide rod inserted into the guide cylinder inside of the guide cylinder; and
at least first and second sub-tanks, each of which includes an air chamber communicating with the rebound air spring chamber,
wherein the first sub-tank is provided at a position different from that of the second sub-tank,
wherein the first and second sub-tanks communicate with the rebound air spring chamber through a hole formed inside the guide,
wherein a lower end portion of the guide rod is fastened to a bottom bolt which is inserted into a bottom portion of an axle bracket,
wherein the inner side air spring chamber and the rebound air spring chamber are not in fluid communication with one another, and
wherein the second sub-tank is provided outside the vehicle body side tube and the axle side tube.

2. The spring leg of the front fork according to claim 1, wherein the suspension spring is further composed of an outer side air spring chamber defined by the vehicle body side tube and the axle side tube on an outer side of the inner side air spring chamber in the guide cylinder.

3. The spring leg of the front fork according to claim 1, wherein the second sub-tank is provided in the axle bracket, which is attached to a lower end portion of the axle side tube.

4. The spring leg of the front fork according to claim 1, wherein the first sub-tank is provided inside the vehicle body side tube and the axle side tube.

5. The spring leg of the front fork according to claim 4, wherein the first sub-tank is provided in the guide of the guide rod.

6. The spring leg of the front fork according to claim 1, wherein the first sub-tank is provided in the guide rod.

7. The spring leg of the front fork according to claim 6, wherein the first sub-tank is defined by an inner surface of the guide rod.

8. The spring leg of the front fork according to claim 1, wherein the inner side air spring chamber and the rebound air spring chamber generate spring force independently.

9. The spring leg of the front fork according to claim 1, wherein the rebound air spring chamber is configured to generate a spring force that urges the vehicle body side tube and the axle side tube in a direction for contracting the vehicle body side tube and the axle side tube.

10. The spring leg of the front fork according to claim 1, wherein the second sub-tank is integrally provided in the axle bracket, which is attached to a lower end portion of the axle side tube.

11. The spring leg of the front fork according to claim 1, wherein the second sub-tank includes a second air chamber formed by a longitudinal chamber and a lateral chamber that are connected in an L shape manner.

12. The spring leg of the front fork according to claim 1, wherein the bottom bolt includes, in a center portion, a bottomed center hole which communicates with the lower end portion of the guide rod; a plurality of radial holes extending in a radial direction from the bottomed center hole; and an annular groove formed in an outer circumference of the bottom bolt,
outer ends of the plurality of radial holes open to the annular groove, and
the second sub-tank further communicates with the rebound air spring chamber via a plurality of communication ports, the annular groove, the plurality of radial holes and the bottomed center hole.

13. The spring leg of the front fork according to claim 1, wherein the second sub-tank is radially displaced from the vehicle body side tube and the axle side tube.

14. The spring leg of the front fork according to claim 1, wherein the second sub-tank is disposed in a non-coaxial arrangement relative to the vehicle body side tube and the axle side tube.

15. The spring leg of the front fork according to claim 1, wherein a central longitudinal axis of the second sub-tank is laterally offset from a central longitudinal axis of each of the vehicle body side tube and the axle side tube.

16. The spring leg of the front fork according to claim 1, wherein the second sub-tank is an integral part of an axle bracket so as to define a single structure and extends outwardly from a bracket portion thereof.

17. A spring leg of a front fork comprising:
a vehicle body side tube;
an axle side tube being slidably engaged with the vehicle body side tube;
a guide cylinder being provided in a center portion inside one of the vehicle body side tube and the axle side tube;
a guide rod provided in a center portion inside the other of the vehicle body side tube and the axle side tube where the guide rod has a guide being inserted into the guide cylinder;
a rod guide which is provided in the guide cylinder where the guide rod is inserted in and supported by the rod guide;
a suspension spring being composed of;
an inner side air spring chamber defined by the guide of the guide rod inside the guide cylinder, and
a rebound air spring chamber formed between the rod guide, and the guide of the guide rod inserted into the guide cylinder inside of the guide cylinder; and
at least first and second sub-tanks, each of which includes an air chamber communicating with the rebound air spring chamber,
wherein the first sub-tank is provided at a position different from that of the second sub-tank,
wherein the first and second sub-tanks communicate with the rebound air spring chamber through a hole formed inside the guide, wherein the inner side air spring chamber and the rebound air spring chamber are not in fluid communication with one another, and wherein the second sub-tank is provided outside the vehicle body side tube and the axle side tube, and the second sub-tank includes a second air chamber formed by a longitudinal chamber and a lateral chamber that are connected in an L shape manner, and the second sub-tank further includes a plurality of communication ports orthogonal to an axial direction of the lateral chamber and opening on a bottom portion inner circumferential surface of the lateral chamber.

18. The spring leg of the front fork according to claim 17, wherein the second air chamber communicates with the rebound air spring chamber via the communication ports.

19. A spring leg of a front fork comprising:
   a vehicle body side tube;
   an axle side tube being slidably engaged with the vehicle body side tube;
   a guide cylinder being provided in a center portion inside one of the vehicle body side tube and the axle side tube;
   a guide rod provided in a center portion inside the other of the vehicle body side tube and the axle side tube where the guide rod has a guide being inserted into the guide cylinder;
   a rod guide which is provided in the guide cylinder where the guide rod is inserted in and supported by the rod guide;
   a suspension spring being composed of;
      an inner side air spring chamber defined by the guide of the guide rod inside the guide cylinder, and
      a rebound air spring chamber formed between the rod guide, and the guide of the guide rod inserted into the guide cylinder inside of the guide cylinder; and
   at least first and second sub-tanks, each of which includes an air chamber communicating with the rebound air spring chamber,
   wherein the first sub-tank is provided at a position different from that of the second sub-tank,
   wherein the first and second sub-tanks communicate with the rebound air spring chamber through a hole formed inside the guide,
   wherein the inner side air spring chamber and the rebound air spring chamber are not in fluid communication with one another,
   wherein the second sub-tank is provided outside the vehicle body side tube and the axle side tube, and
   wherein a lower end portion of the guide rod is fastened to a bottom bolt which is inserted into a bottom portion of an axle bracket, the bottom bolt being separate from the guide rod and including a fluid passageway that provides fluid communication between the second sub-tank and the rebound air spring chamber.

* * * * *